United States Patent
Oi et al.

(10) Patent No.: US 11,775,367 B2
(45) Date of Patent: Oct. 3, 2023

(54) AUTOMATIC COOPERATION APPARATUS, AUTOMATIC COOPERATION METHOD AND AUTOMATIC COOPERATION PROGRAM

(71) Applicant: Nippon Telegraph and Telephone Corporation, Tokyo (JP)

(72) Inventors: Aiko Oi, Musashino (JP); Atsushi Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/625,382

(22) PCT Filed: Jul. 8, 2019

(86) PCT No.: PCT/JP2019/027002
§ 371 (c)(1),
(2) Date: Jan. 7, 2022

(87) PCT Pub. No.: WO2021/005686
PCT Pub. Date: Jan. 14, 2021

(65) Prior Publication Data
US 2022/0253349 A1  Aug. 11, 2022

(51) Int. Cl.
*G06F 11/07* (2006.01)

(52) U.S. Cl.
CPC ........ *G06F 11/0709* (2013.01); *G06F 11/079* (2013.01)

(58) Field of Classification Search
CPC .............................. G06F 11/079; G06F 11/0709
See application file for complete search history.

(56) References Cited

U.S. PATENT DOCUMENTS

| | | | |
|---|---|---|---|
| 2010/0070462 A1 | 3/2010 | Wada et al. | |
| 2014/0279800 A1* | 9/2014 | Anastasopoulos | G06N 5/025 706/47 |
| 2015/0095101 A1* | 4/2015 | Kymal | G06F 30/00 705/7.28 |
| 2017/0161181 A1* | 6/2017 | Koreki | G06F 11/3672 |
| 2019/0289058 A1* | 9/2019 | Bhoj | H04L 43/0805 |

FOREIGN PATENT DOCUMENTS

| | | |
|---|---|---|
| JP | 2004-80297 | 3/2004 |
| JP | 2010-72834 | 4/2010 |
| JP | 2018-32897 | 3/2018 |

* cited by examiner

*Primary Examiner* — Jigar P Patel
(74) *Attorney, Agent, or Firm* — Fish & Richardson P.C.

(57) ABSTRACT

An automatic coordination apparatus 30 includes: a scenario creation unit 100 that creates a scenario; a scenario coordination unit 200 that coordinates a plurality of the scenarios; and a scenario management and execution unit 32 that manages and executes the scenario, wherein a failure handling business operation is broken down into common and individual tasks, a parent scenario or a child scenario is defined for each of the separated tasks or each task group made by combining a plurality of tasks, the scenario is divided, management across a plurality of the scenarios is performed based on a relationship between each scenario and a status of execution of each scenario, and the scenario is discontinued or changed depending on a process and a content of failure handling.

9 Claims, 15 Drawing Sheets

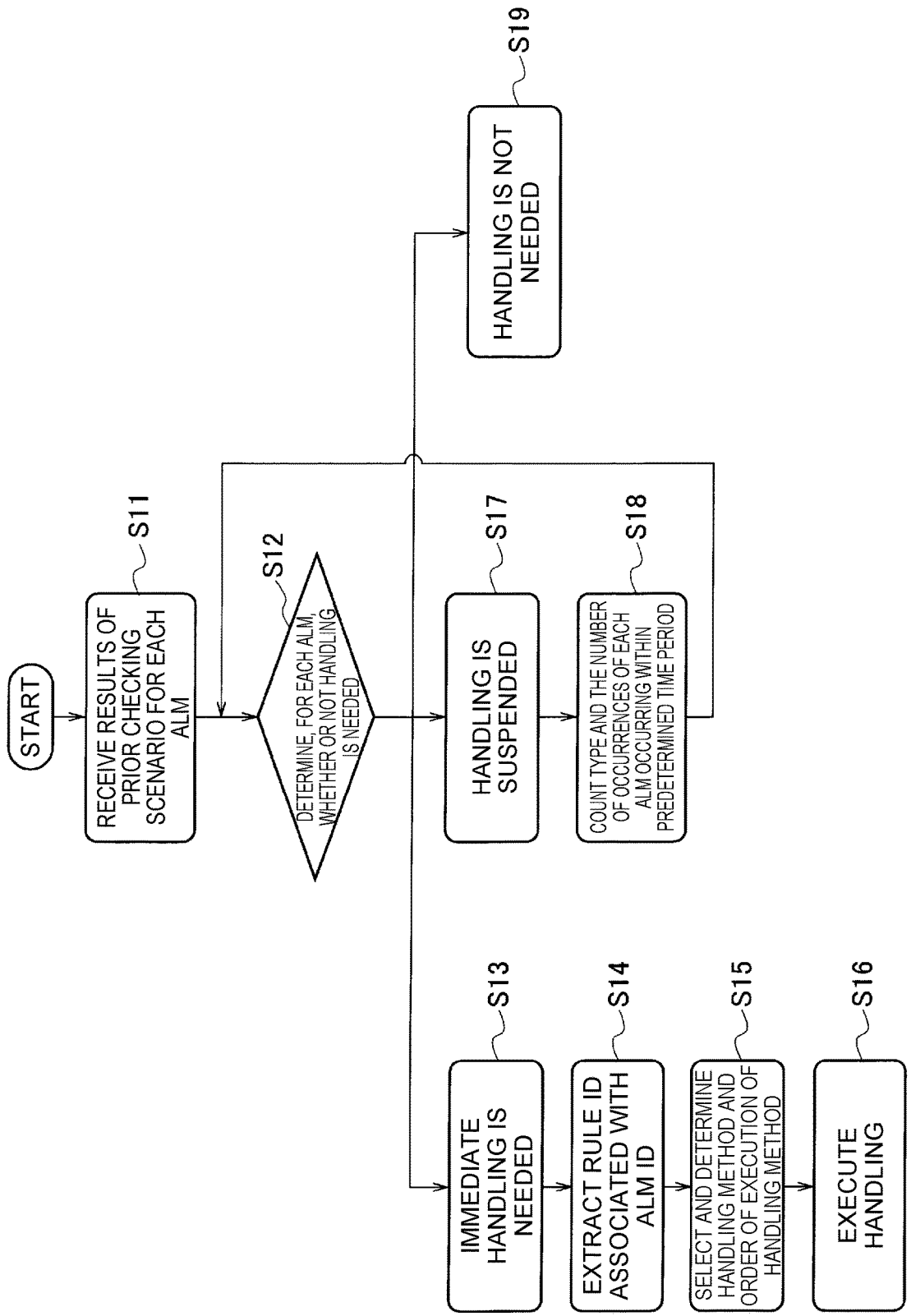

Fig. 6

| PRIOR CHECKING SCENARIO ITEM | ITEM NUMBER | CONDITION | LIST OF OUTPUTS |
|---|---|---|---|
| CHECK HANDLING HISTORY | 10 | WHETHER SPECIFIC PART IS MOUNTED BEFORE EVENT OCCURS | NO, DONE |
| | 11 | WHETHER REACTIVATION IS PERFORMED BEFORE EVENT OCCURS | NO, DONE |
| CHECK FAILURE HANDLING SITUATION | 20 | WHETHER HANDLING BY DEVICE HANDLING SYSTEM IS UNDERWAY | NO, UNDERWAY |
| | 21 | WHETHER MANUAL HANDLING IS UNDERWAY | NO, UNDERWAY |
| CHECK DEVICE STATE | 30 | WHETHER RESULT OF DEVICE STATE CHECKING BY DEVICE HANDLING SYSTEM IS OK OR NG | OK, NG |
| CHECK USER DECLARATION | 40 | WHETHER USER DECLARATION IS ISSUED | NO, YES |
| CHECK TRAFFIC STATE | 50 | WHETHER THERE IS CHANGE IN TRAFFIC VOLUME BETWEEN BEFORE AND AFTER EVENT OCCURS | THERE IS NO CHANGE, THERE IS CHANGE |
| CHECK FAILURE HISTORY AT LOWER LAYER | 60 | WHETHER FAILURE OCCURS AT LOWER LAYER (TRANSMISSION LAYER) | NO, YES |

Fig. 7

| ALM ID | PRIMARY DETERMINATION CONDITION ID | PRIMARY DETERMINATION RESULT |
|---|---|---|
| X10<br>Y33<br>Z60 | 10 | IMMEDIATE HANDLING IS NEEDED |
| — | 90 | |
| — | 01 | HANDLING IS NOT NEEDED |
| — | 02 | |
| — | 03 | |
| — | 20 | |
| X25 | 01 | HANDLING IS SUSPENDED |
| Y71 | 11 | |
| Y50 | 12 | |
| Y50 | 13 | |
| Y50 | 13 | |
| X25 | 01 | |
| Y50 | 12 | |

Fig. 8
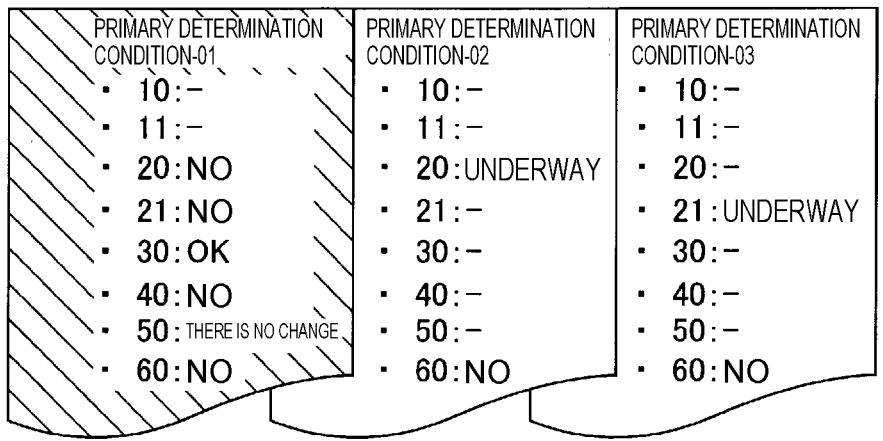
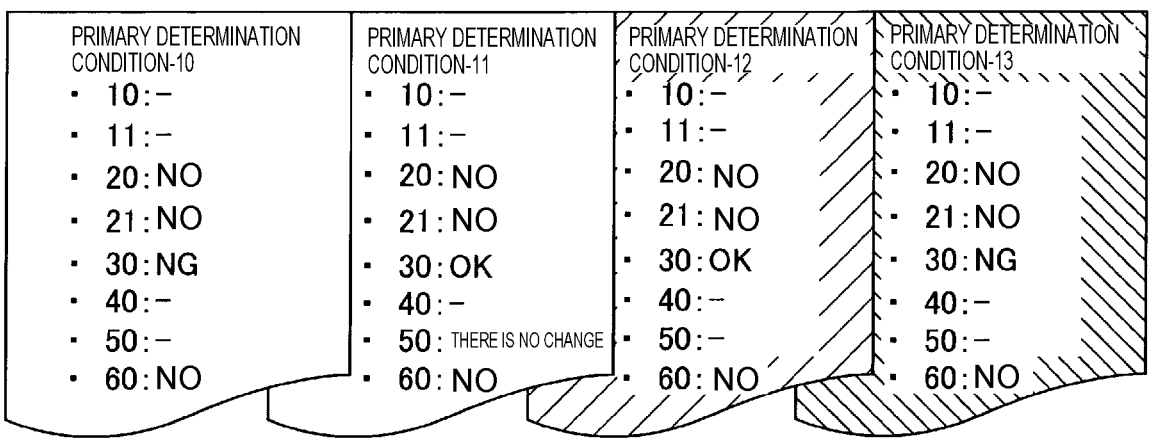
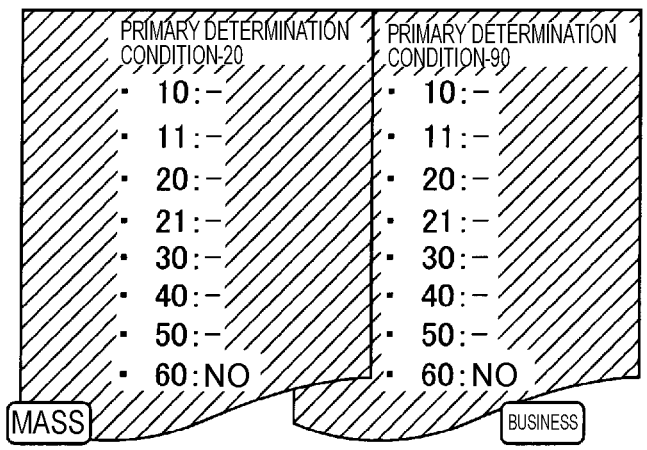

Fig. 9

| ALM ID | PRIMARY DETERMINATION CONDITION ID | PRIMARY DETERMINATION RESULT | ALM OCCURRENT HISTORY CONDITION | SECONDARY DETERMINATION RESULT | CONTENT OF HANDLING | HANDLING SCENARIO ID |
|---|---|---|---|---|---|---|
| X10 Y33 Z60 | 10 | IMMEDIATE HANDLING IS NEEDED | - | - | HANDLING A | #A100 |
| - | 90 | | - | - | ANNOUNCEMENT B | #B200 |
| - | 01 | HANDLING IS NOT NEEDED | - | TERMINATE | - | - |
| - | 02 | | - | | - | - |
| - | 03 | | - | | - | - |
| - | 20 | | - | | - | - |
| Y25 | 01 | | ALM 10 OCCURS 10 OR MORE TIMES WITHIN ONE MINUTE | | ANNOUNCEMENT B ⇒ HANDLING A | #BA300 |
| Y71 | 11 | | ALM 3 RECURS | | HANDLING A ⇒ ANNOUNCEMENT B | #AB100 |
| Y50 | 12 | HANDLING IS SUSPENDED | ALM 1 AND ALM 2 OCCUR WITHIN FIVE SECONDS AND RECUR THREE OR MORE TIMES WITHIN 60 MINUTES | HANDLING IS NEEDED | HANDLING B | #B100 |
| Y50 | 13 | | ALM 1 AND ALM 2 OCCUR WITHIN FIVE SECONDS AND DO NOT RECUR THREE OR MORE TIMES WITHIN 60 MINUTES | | HANDLING B | #B100 |
| Y50 | 13 | | ALM 1 OCCURS, AND THEN ALM 2 OCCURS AFTER LAPSE OF FIVE OR MORE SECONDS | HANDLING IS NOT NEEDED | HANDLING A | #A100 |
| X25 | 01 | | ALM 10 OCCURS LESS THAN 10 TIMES WITHIN ONE MINUTE | | - | - |
| Y50 | 12 | | ALM 1 AND ALM 2 OCCUR WITHIN FIVE SECONDS AND DO NOT RECUR THREE OR MORE TIMES WITHIN 60 MINUTES | | - | - |

AUTOMATIC COOPERATION APPARATUS, AUTOMATIC COOPERATION METHOD AND AUTOMATIC COOPERATION PROGRAM

CROSS-REFERENCE TO RELATED APPLICATIONS

This application is a National Stage application under 35 U.S.C. § 371 of International Application No. PCT/JP2019/027002, having an International Filing Date of Jul. 8, 2019, the disclosure of which is considered part of the disclosure of this application, and is incorporated in its entirety into this application.

TECHNICAL FIELD

The present invention relates to an automatic coordination apparatus, an automatic coordination method, and an automatic coordination program.

BACKGROUND ART

Currently, wholesale service providers that provide various types of services, such as network (NW) services, cloud services, and application (APL) services, have been emerging. With the advent of such wholesale service providers, some service providers that provide services to end users have taken forms in which the service providers do not own assets themselves, and provide distinctive services of the service providers by combining services provided by wholesale service providers. The NW services are services using a network, such as a wide-area L2 (Ethernet®) service, an IP-VPN (Internet Protocol Virtual Private Network) service, and MVNO (Mobile Virtual Network Operator). The cloud services are services based on an IaaS (Infrastructure as a Service) infrastructure and the like. The APL services are services in a form of software provision that allow required communication-related functionality, as much as required, to be used as a service.

Each wholesale service provider releases one communication service with an API (Application Programming Interface). Accordingly, for example, when a service provider that provides a communication service to users desires to use communication functionality of a NW service, the service provider accesses an API that releases the NW service. When the service provider desires to use communication functionality of a cloud service, the service provider accesses an API that releases the cloud service. When the service provider desires to use communication functionality of an APL service, the service provider accesses an API that releases the APL service. As described above, the service provider provides the communication service to users by using one communication service released by one wholesale service provider.

As a technique of such a type, a device has been known that stores catalogs in which specifications of wholesale services for communication are described and coordination rules in which coordination between various types of communication services is defined, and that constructs a coordinated service by coordinating service APIs in a package based on the catalogs and the coordination rules (see Patent Literature 1). According to the technique of Patent Literature 1, a coordinated service that is a combination of various types of communication services of a plurality of wholesale service providers can be constructed in a package and provided, in response to an order request from a communication service provider.

CITATION LIST

Patent Literature

Patent Literature 1: Japanese Patent Laid-Open No. 2018-32897

SUMMARY OF THE INVENTION

The technique (orchestrator) of Patent Literature 1 focuses attention on a service construction business operation and therefore has a problem that the technique is good at system coordination following a simple business operation flow that is predefined and fixed with a small number of conditional branches, but is not good at system coordination following a complicated business operation flow such as a failure handling business operation. In other words, in the failure handling business operation, since a content/method of a subsequent process step changes depending on a result of each process step, a business operation flows is fluid and complicated with numerous conditional branches. When the conventional technique is applied, since a failure handling business operation flows in which exhaustive conditional branches are described needs to be provided in each catalog/coordination rule (scenario), the quantity of provisions is enormous, so that system performance in the conventional technique may be degraded. Moreover, in the failure handling business operation, raising of an alarm (ALM) from a device serves as a trigger and causes failure handling to be started (a scenario to be executed). However, since there is a dependency relationship between ALMs (main-factor ALM and repercussion ALM, or the like), it is not simply that a scenario may be executed for each ALM independently. For example, there are some cases where a failure occurring at a transmission layer causes an ALM not only at the transmission layer, but also at a forwarding layer, which is an upper layer, in a ripple effect manner. In such a case, the ALM at the transmission layer is a main-factor ALM, and the ALM at the forwarding layer is a repercussion ALM. When a scenario is already executed for each of the ALMs, the scenario for the repercussion ALM on the forwarding layer side needs to be discontinued, or a content of the scenario needs to be changed. Management and control across a plurality of scenarios are needed as described above, but are not taken into consideration in the conventional technique. Hence, the conventional technique is not suitable for the failure handling business operation.

An object of the present invention, which has been made in view of the above-described circumstances, is to provide an automatic coordination apparatus, an automatic coordination method, and an automatic coordination program that are applicable to the failure handling business operation.

Means for Solving the Problem

An automatic coordination apparatus according to an aspect of the present invention includes: a scenario creation unit that creates a scenario; a scenario coordination unit that coordinates a plurality of the scenarios; and a scenario management and execution unit that manages and executes the scenario, wherein a failure handling business operation is broken down into common and individual tasks, a parent scenario or a child scenario is defined for each of the separated tasks or each task group made by combining a plurality of tasks, the scenario is divided, management across a plurality of the scenarios is performed based on a relationship between each scenario and a status of execution of each scenario, and the scenario is discontinued or changed depending on a process and a content of failure handling.

An automatic coordination method according to an aspect of the present invention includes: by an automatic coordination apparatus, a scenario creation step of creating a scenario; a scenario coordination step of coordinating a plurality of the scenarios; and a scenario management and execution step of managing and executing the scenario, wherein a failure handling business operation is broken down into common and individual tasks, a parent scenario or a child scenario is defined for each of the separated tasks or each task group made by combining a plurality of tasks, the scenario is divided, management across a plurality of the scenarios is performed based on a relationship between each scenario and a status of execution of each scenario, and the scenario is discontinued or changed depending on a process and a content of failure handling.

An aspect of the present invention is an automatic coordination program causing a computer to function as the automatic coordination apparatus.

Effects of the Invention

According to the present invention, an automatic coordination apparatus, an automatic coordination method, and an automatic coordination program can be provided that are applicable to a failure handling business operation.

BRIEF DESCRIPTION OF DRAWINGS

FIG. 5 is a flowchart showing an example of operation when it is determined whether or not execution of a handling scenario is needed and which handling scenario is executed.

FIG. 6 shows items of a prior checking scenario and a list of outputs.

FIG. 7 shows a list of primary determination condition IDs and results by ALM.

FIG. 8 shows primary determination conditions as to whether or not handling is needed, based on combinations of outputs of the prior checking scenario.

FIG. 9 shows a method for determining a content of a handling scenario (selection of a handling scenario).

DESCRIPTION OF EMBODIMENTS

Hereinafter, an embodiment of the present invention will be described with reference to drawings. In a description of the drawings, the same portions are denoted by the same reference signs, and an overlapping description thereof will be omitted.

Embodiment

An embodiment of the present invention relates to an automatic coordination technique for operation systems for a maintenance system. The embodiment of the present invention aims to achieve a reduction in workload of an operator by automatically coordinating a group of operation systems for a maintenance system by using an orchestrator, and thereby automating a failure handling business operation related to a failure in a simplex system.

Specifically, the embodiment of the present invention enables a coordination rule requiring an enormous number of conditional branches to be divided, and a plurality of child scenarios associated with divided coordination rules to be dynamically combined. Moreover, the embodiment of the present invention enables management and control that extend across a plurality of scenarios, taking into consideration a dependency relationship between the scenarios. As a result, the embodiment of the present invention achieves not only automation of the failure handling business operation, but also enhanced performance of the orchestrator.

(Entire Configuration of Communication System)

Figure 1:
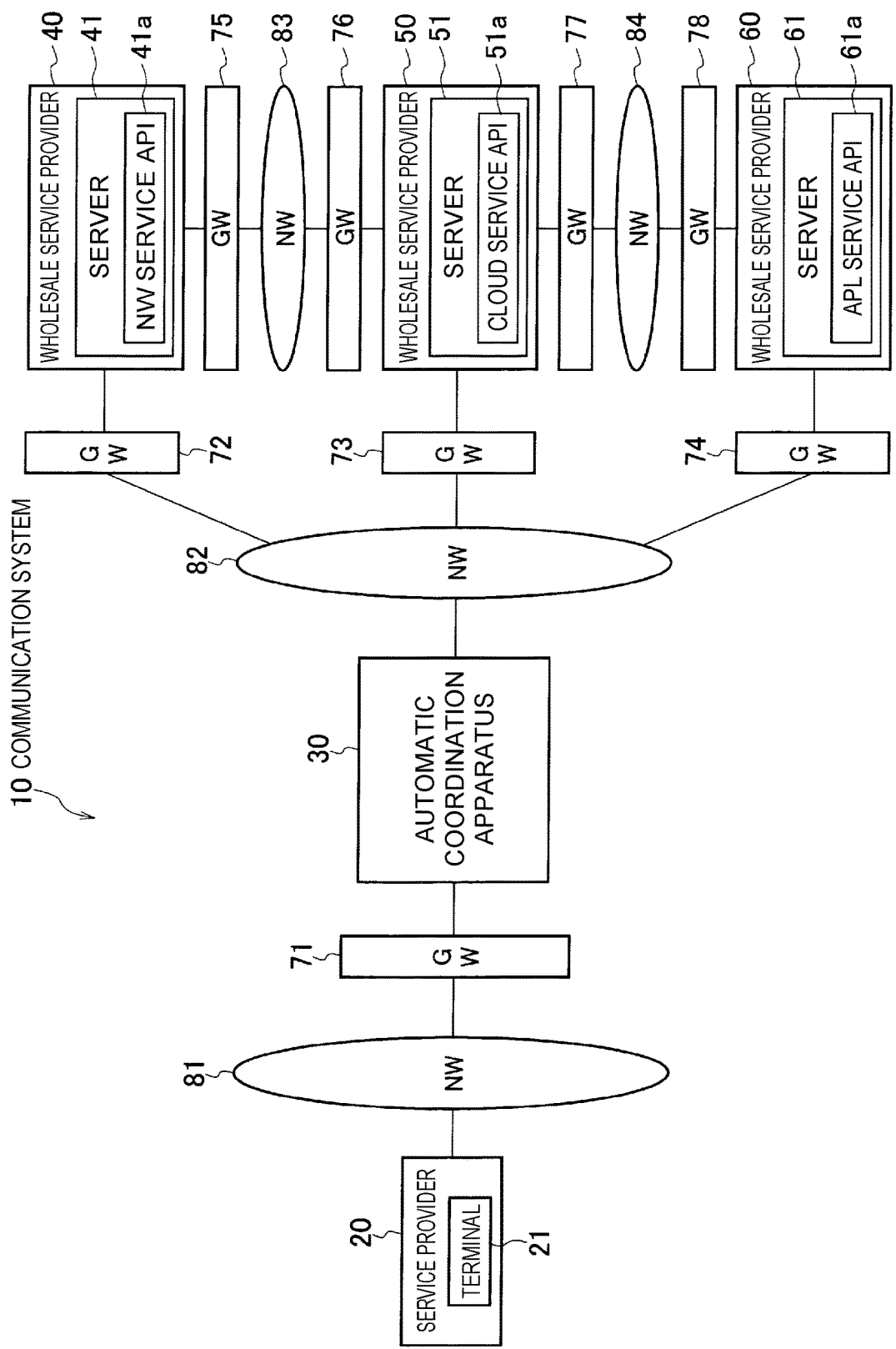
FIG. 1 is a configuration diagram showing an entire communication system according to an embodiment of the present invention.

FIG. 1 is a configuration diagram showing an entire communication system 10 according to the embodiment of the present invention. The communication system 10 includes a terminal 21 of a service provider 20, an automatic coordination apparatus 30, and respective servers 41, 51, 61 of a plurality of wholesale service providers 40, 50, 60. The terminal 21 of the service provider 20 is connected to the automatic coordination apparatus 30 via a NW (network) 81 and a GW (gateway) 71. The automatic coordination apparatus 30 is connected to the respective servers 41, 51, 61 of the wholesale service providers 40, 50, 60 via a NW 82 and GWs 72, 73, 74, respectively. The server 41 and the server 51 are connected to each other via a GW 75, a NW 83, and a GW 76. The server 51 and the server 61 are connected to each other via a GW 77, a NW 84, and a GW 78.

The GW 71 between the terminal 21 and the automatic coordination apparatus 30 performs processing of determining whether or not an order request that is an order for a communication service from the terminal 21 is a pre-permitted request. In a case of a permitted order request, the automatic coordination apparatus 30 transmits, to any of the servers 41, 51, 61, one or more requests for acquisition or the like of one or more communication services corresponding to the order request. The GWs 72, 73, 74 between the automatic coordination apparatus 30 and the wholesale service providers 40, 50, 60 perform processing of determining whether or not requests transmitted to the servers 41, 51, 61 are pre-permitted requests from the automatic coordination apparatus 30. The GWs 75 to 78 between the servers 41, 51, 61 perform authentication processing for connecting the servers 41, 51, 61 to the NWs 83, 84.

Each wholesale service provider 40, 50, 60 releases a mutually different communication service with an API. The server 41 of the wholesale service provider 40 is equipped with a NW service API 41a that releases a NW service. The server 51 of the wholesale service provider 50 is equipped with a cloud service API 51a that releases a cloud service. The server 61 of the wholesale service provider 60 is equipped with an APL (application) service API 61a that releases an APL service.

The service provider 20 provides an own distinctive communication service to users by using one or more of the various types of communication services released by the wholesale service providers 40, 50, 60. When the service provider 20 uses one or more communication services, the service provider 20 makes an order request for acquisition of the one or more communication services to the automatic coordination apparatus 30 and acquires the one or more communication services.

In the technique of Patent Literature 1, a plurality of wholesale services are coordinated through APIs. In the embodiment of the present invention, a plurality of operation systems are coordinated through APIs.

The automatic coordination apparatus 30 comprehensively controls the APIs 41a, 51a, 61a of the various types of communication services. Moreover, the automatic coordination apparatus 30 breaks the failure handling business operation down into common and individual tasks. The automatic coordination apparatus 30 divides a scenario by defining a parent scenario or a child scenario for the separated tasks. Further, the automatic coordination apparatus 30 performs management across scenarios, based on a relationship between and a status of each scenario (parent scenario), and performs discontinuation, change, or the like of a scenario, depending on a process/content of failure handling. Thus, the automatic coordination apparatus 30 can select an appropriate subsequent scenario, depending on a result of each process step (scenario). The automatic coordination apparatus 30 discontinues a scenario for a repercussion ALM when it is estimated that the scenario is for a repercussion from a main factor, and thus can eliminate unnecessary processing and achieve efficient processing.

(Configuration of Automatic Coordination Apparatus)

Figure 2:
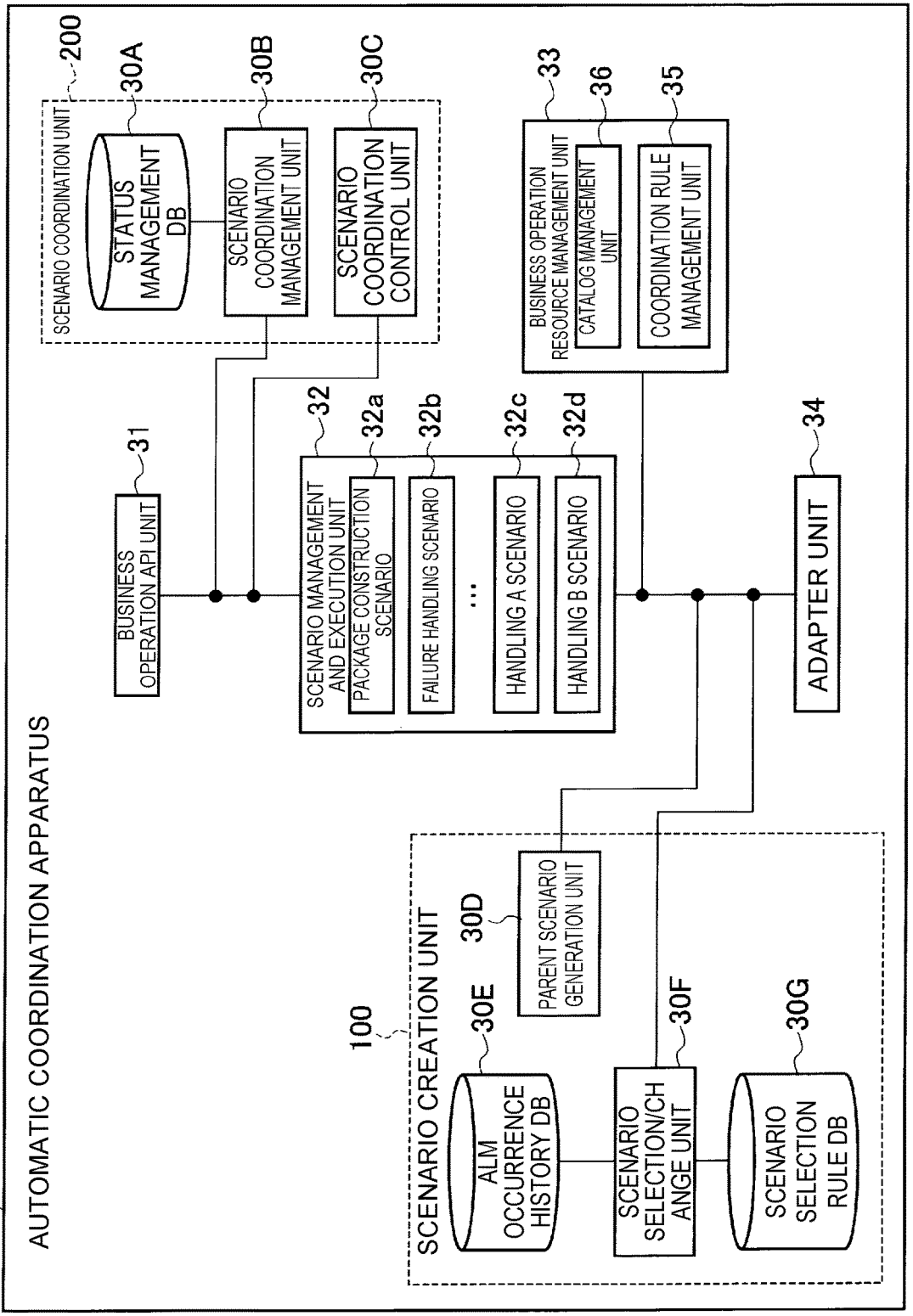
FIG. 2 is a block diagram showing a configuration of an automatic coordination apparatus.

FIG. 2 is a block diagram showing a configuration of the automatic coordination apparatus 30. As shown in FIG. 2, the automatic coordination apparatus 30 includes a business operation API unit 31, a scenario management and execution unit 32, a business operation resource management unit 33, an adapter unit 34, a status management DB 30A, a scenario coordination management unit 30B, a scenario coordination control unit 30C, a parent scenario generation unit 30D, an ALM occurrence history DB 30E, a scenario selection/change unit 30F, and a scenario selection rule DB 30G.

The business operation API unit 31 accepts an order request for failure handling, and causes the scenario management and execution unit 32 to execute an appropriate scenario through API processing corresponding to a content of the request. For example, the order request for failure handling is issued by an operator triggered by raising of a device alarm, or is automatically issued after the system receives a device alarm and analyzes an alarm message or the like. The scenario management and execution unit 32 manages and executes each individual scenario. The business operation resource management unit 33 manages business operation resources. The adapter unit 34 is connected to the respective servers 41, 51, 61 of the wholesale service providers 40, 50, 60. The status management DB 30A is a database that manages statuses by scenario (handling ALM).

The scenario coordination management unit 30B manages relationships, statuses, and the like between scenarios. The scenario coordination control unit 30C performs control across scenarios. The parent scenario generation unit 30D automatically generates a parent scenario. The ALM occurrence history DB 30E is a database that manages an ALM occurrence history. The scenario selection/change unit 30F refers to the scenario selection rule DB 30G and selects and combines appropriate scenarios from among a plurality of scenarios. The scenario selection rule DB 30G is a database that manages scenario selection rules.

The scenario management and execution unit 32 includes a package construction scenario 32a, a failure handling scenario 32b, a handling A scenario 32c, a handling B scenario 32d, and the like. The above-mentioned scenarios will also be referred simply as scenarios 32s. Each scenario 32s is implemented with an API. Note that a parent scenario shown in FIG. 4 corresponds to the failure handling scenario 32b. Moreover, a "handling A scenario" among "individual task child scenarios" shown in FIG. 4 corresponds to the handling A scenario 32c.

The business operation resource management unit 33 includes a catalog management unit 36 and a coordination rule management unit 35. The catalog management unit 36 manages catalogs. Each catalog is used in processing of execution by the scenario management and execution unit 32. The coordination rule management unit 35 manages coordination rules. Each coordination rule is used in processing of execution by the scenario management and execution unit 32.

Note that in a following description, the status management DB 30A, the scenario coordination management unit 30B, and the scenario coordination control unit 30C will be referred collectively as a "scenario coordination unit 200" in some cases. The parent scenario generation unit 30D, the ALM occurrence history DB 30E, the scenario selection/change unit 30F, and the scenario selection rule DB 30G will be referred collectively as a "scenario creation unit 100" in some cases. The scenario creation unit 100 may be thought to include the failure handling scenario 32b, the handling A scenario 32c, and the handling B scenario 32d.

As described above, in the present embodiment, a functional unit (scenario coordination unit 200) is newly provided that manages a relationship between and a status of each scenario and that orders control, such as discontinuation or change, of each individual scenario, whereby coordination between scenarios is achieved, and efficiency in failure handling is improved. It is the scenario coordination management unit 30B that determines discontinuation/change of a scenario, and it is the scenario coordination control unit 30C that performs control of discontinuing/changing the scenario. Moreover, a functional unit (scenario creation unit 100) is newly provided that divides a scenario (coordination rule) and selects/changes a scenario, whereby it is made possible not only to flexibly change a scenario depending to a situation, but also to reduce the quantity of coordinated scenarios read by the scenario management and execution unit 32, and enhanced performance is thus achieved.

(Example of Failure Handling Business Operation Flow)

Figure 3:
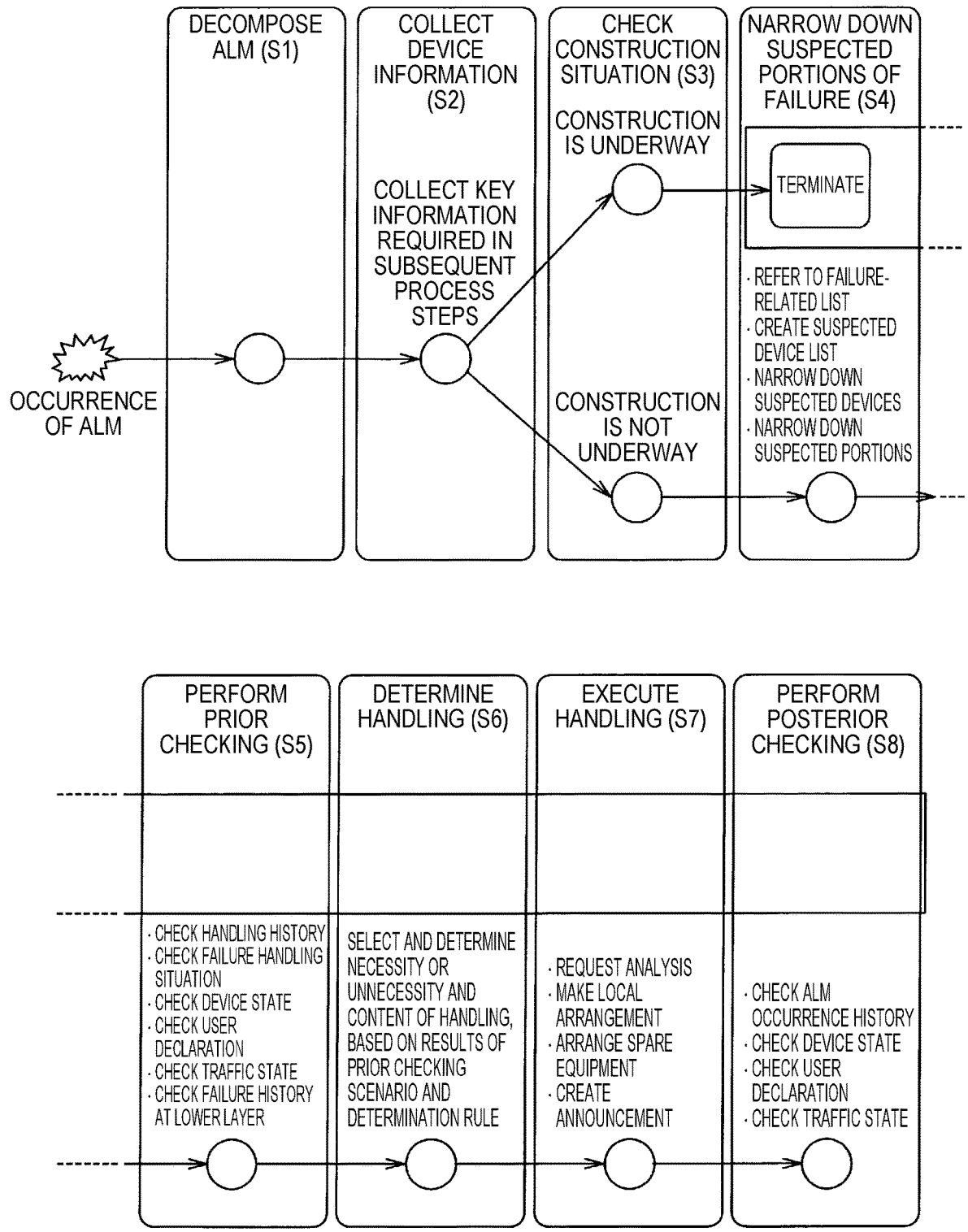
FIG. 3 shows a failure handling business operation flow and an example of each process step included in the flow.

FIG. 3 shows a failure handling business operation flow and an example of each process step included in the flow. In the failure handling business operation, with occurrence of a device alarm or the like serving as a trigger, tasks are executed, including decomposition and sorting of an alarm, separation of a failure, estimation of a suspected portion, prior checking before handling, execution of handling, posterior checking after handling, and the like. A content of a subsequent process step to be executed needs to be determined depending on a result of processing in a process step for each task. Here, although "occurrence of an ALM" serves as a trigger of a failure handling scenario, a user declaration or detection of a traffic abnormality may serve as a trigger.

Specifically, as shown in FIG. 3, first, when an alarm occurs, the alarm is decomposed and sorted, and key information required in subsequent process steps is collected (step S1→S2). Next, a situation of construction is checked, and when the construction is underway, the process is terminated, and when the construction is not underway, suspected portions of a failure are narrowed down (step S3→S4). For example, referring to a failure-related list, creation of a suspected device list, narrowing down of suspected devices, narrowing down of suspected portions, and the like are performed. Next, prior checking before handling is performed (step S5). For example, checking of a handling history, checking of a situation of failure handling, checking of a device state, checking of a user declaration, checking of a traffic state, checking of a failure history at a lower layer, and the like are performed. Next, determination of handling is performed (step S6). For example, necessity or unnecessity and a content of handling is selected and determined, based on results of a prior checking scenario and determination rules. Next, handling is executed (step S7). For example, requesting of analysis, local arrangement, arrangement of spare equipment, creation of an announcement, and the like are performed. Lastly, posterior checking is performed (step S8). For example, checking of the ALM occurrence history, checking of a device state, checking of a user declaration, checking of a traffic state, and the like are performed. Note that the failure handling business operation flow is an example, and a process step may be added/deleted, or the process steps may be permutated in some cases.

(Automatic Parent Scenario Creation Method, Child Scenario Classification Method)

Figure 4A:
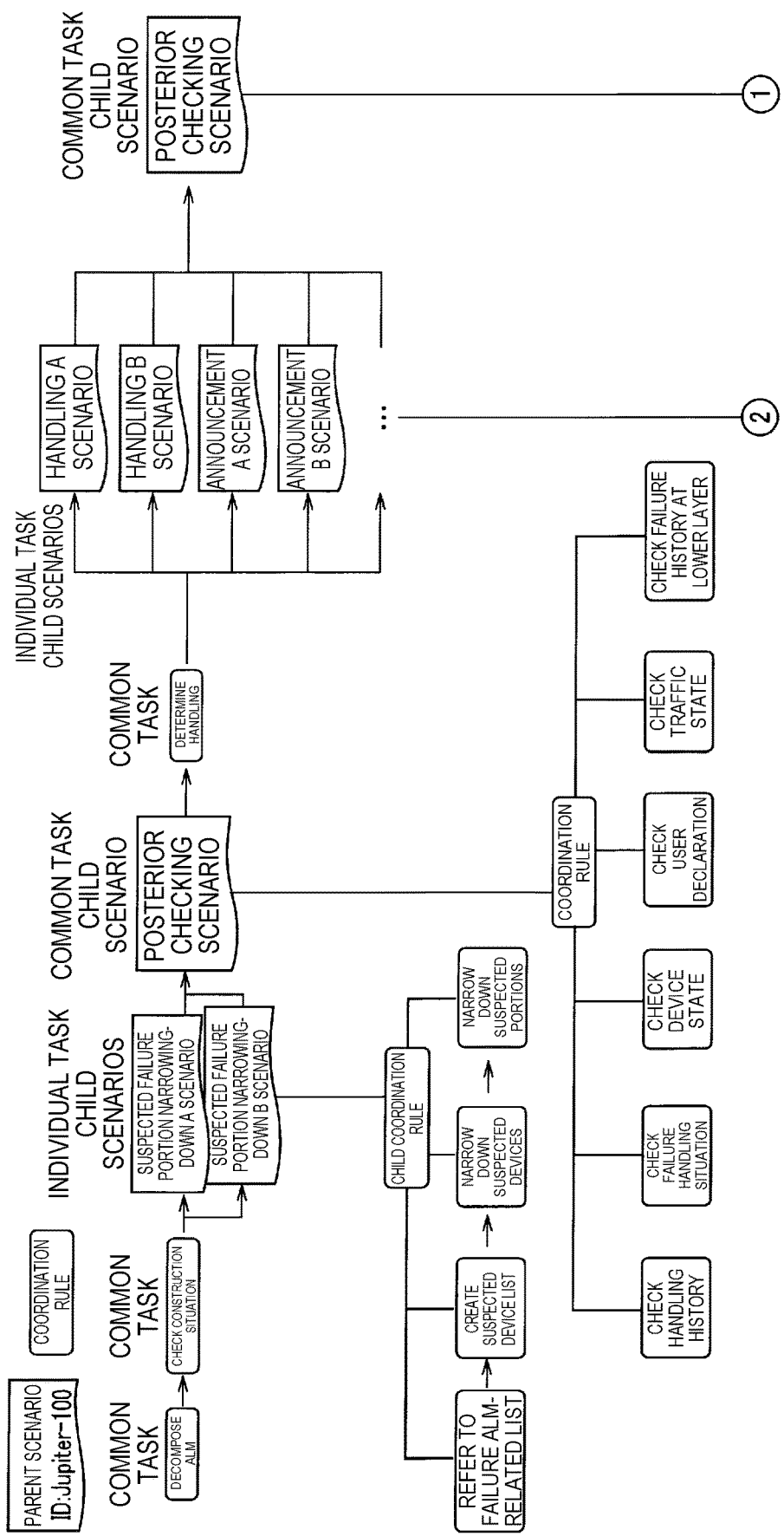
FIG. 4A is a conceptual diagram when automatic parent scenario creation and child scenario classification are performed.
Figure 4B:
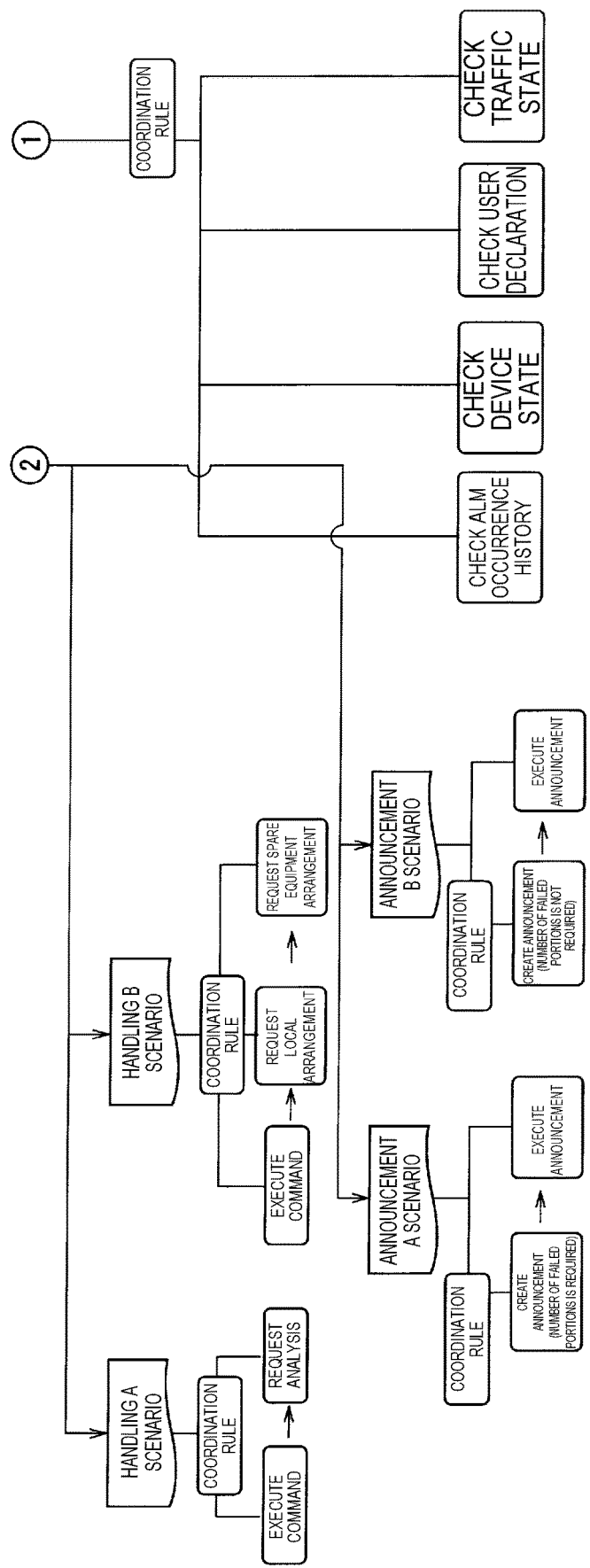
FIG. 4B is a conceptual diagram when automatic parent scenario creation and child scenario classification are performed.

FIGS. 4A and 4B are conceptual diagrams when automatic creation of a parent scenario and classification of child scenarios are performed. As shown in FIGS. 4A and 4B, the failure handling business operation is broken down into common and individual tasks, and some of the separated tasks are treated as child scenarios, whereby division of a coordination rule is achieved. The breaking down of the business operation and the division of the coordination rule (creation of child coordination rules) may be performed manually. The automatic creation of a parent scenario is performed by the parent scenario generation unit 30D. A common task is a task item that is executed in common, regardless of a content of a failure, and it is therefore thought that a content (scenario) of the task is adjusted less frequently. Accordingly, an administrator may focus efforts on creation/editing of scenarios of individual tasks. Moreover, since a common task is not sequential processing, further enhanced performance can be achieved by performing parallel processing.

Note that a common task refers to a failure handling task required in common for almost all failure patterns. For example, occurrence of a device alarm (ALM) can be a trigger to start the failure handling business operation. Since it is necessary, for any failure, to decompose an ALM and analyze why the ALM occurs, which device raises the ALM, and the like, such a task is classified as a common task. An individual task refers to a failure handling task determined for each failure pattern. A scenario refers to two or more failure handling tasks (common task/individual task) that are combined and defined as a series of tasks. A rule such as a handover of a parameter between each task is described in a coordination rule. A parent scenario refers to two or more scenarios (defined as child scenarios) and a failure handling task that are combined and defined as a series of tasks. In the present embodiment, a common task is predefined as an item common to all parent scenarios. A child scenario (suspected failure portion narrowing-down scenario, handling scenario) applicable to an individual task is automatically selected by referring to the predefined "scenario selection rule DB 30G" as the handling is progressed, and a parent scenario is thus completed.

(Handling Scenario Execution Necessity/Unnecessity Determination Method, Content Determination Method)

As to whether or not execution of a handling scenario is needed and which handling scenario is executed, determination needs to be performed based on results of processing of the prior checking scenario (primary determination) and the ALM occurrence history (secondary determination) in combination. Necessity or unnecessity of execution and a content of a handling scenario can be determined only based on the primary determination in some cases, and the secondary determination is further required in some cases. For example, it is assumed that there is an empirical value (or a device specification), such as two or more occurrences of a certain minor ALM (insignificant ALM) within one month leading to occurrence of a major ALM (signification ALM that results in occurrence of a failure). In such a case, when the minor ALM occurs only once, it is determined that "handling is suspended", and when the minor ALM occurs two or more times within one month, it is determined that "handling is needed" even when the major ALM does not occur.

FIG. 5 is a flowchart showing an example of operation when it is determined whether or not execution of a handling scenario is needed and which handling scenario is executed. As shown in FIG. 5, first, when the automatic coordination apparatus 30 receives results of the prior checking scenario for each ALM, the automatic coordination apparatus 30 determines, for each ALM, whether or not handling is needed (step S11→S12). At the time, when it is determined that immediate handling is needed, the automatic coordination apparatus 30 extracts a rule ID associated with an ALM ID, and selects and determines a handling method and order of execution of the handling method, and then executes handling (step S13→S14→S15→S16). When it is determined that handling is suspended, the automatic coordination apparatus 30 counts a type and the number of occurrences of each ALM occurring within a predetermined time period (step S17→S18), and returns to step S12 where it is determined for each ALM whether or not handling is needed. When it is determined that handling is not needed, the automatic coordination apparatus 30 terminates the process without executing handling (step S19).

FIG. 6 shows items of the prior checking scenario and a list of outputs. FIG. 7 shows a list of primary determination condition IDs and results by ALM. An ALM ID represented by "-" means "applicable to all ALMs". FIG. 8 shows primary determination conditions for necessity or unnecessity of handling, based on combinations of outputs of the prior checking scenario. An item number with an output value indicating "-" means that the output value may be any value. As shown in FIGS. 6 to 8, conditions required for the determination of necessity or unnecessity and contents of handling based on a result of execution of each item described in the prior checking scenario (primary determination) are prepared and registered beforehand.

FIG. 9 shows a method for determining a content of a handling scenario (selection of a handling scenario). Conditions required for the determination of necessity or unnecessity and contents of handling based on the ALM occurrence history (secondary determination) are prepared and registered beforehand. An ALM for which a result of the primary determination is "handling is suspended" is compared with the conditions based on the ALM occurrence history, and is associated with a content of handling/scenario.

As described above, the determination of necessity or unnecessity of execution of a handling scenario and the determination of a content of the handling scenario are performed through a procedure as summarized below.

(1): Define an ALM ID for each device ALM that can be subjected to failure handling. Define combinations of output patterns of each item executed in the prior checking scenario as conditions for the primary determination of necessity or unnecessity of handling, and assign IDs. Define primary determination results, based on combinations of an ALM ID and a primary determination condition ID.

(2): When an ALM applicable to (1) occurs, execute the prior checking scenario and store results.

(3): Derive a primary determination condition ID that matches the results in (2), and derive a primary determination result, based on the primary determination condition ID along with an ALM ID.

(4): Predefine contents of handling each corresponding to an ALM ID, a primary determination condition ID, and a primary determination result, and predefine handling scenario IDs associated with the contents of handling, respectively. Describe ALM occurrence history conditions as necessary, and define contents of handling that take the conditions into consideration, secondary determination, and handling scenario IDs.

(5): Execute handling according to the result in (3). When secondary determination is required, suspend handling according to the condition, and perform the secondary determination.

(Inter-Scenario Coordination Method)

In some cases, failure ALMs occur by affecting each other. For example, it is conceivable that a repercussion of a failure occurring at a transmission layer causes a failure ALM (repercussion ALM) to occur also at a forwarding layer. In such a case, although a failure handling scenario is invoked for each of the ALMs occurring at the transmission layer and the forwarding layer, the failure handling scenario on the forwarding layer side is discontinued, or a scenario change is made, when it can be determined that the ALM on the forwarding layer side is a repercussion ALM. As a result, redundant processing that is primarily unrequired can be eliminated, and efficient processing can be performed.

In other words, in the conventional technique, since only management of individual scenarios can be performed, unrequired processing is performed for a repercussion ALM. In the present embodiment, by contrast, since management across scenarios can be performed, discontinuation of unrequired processing and a flexible scenario change are possible.

Figure 10:
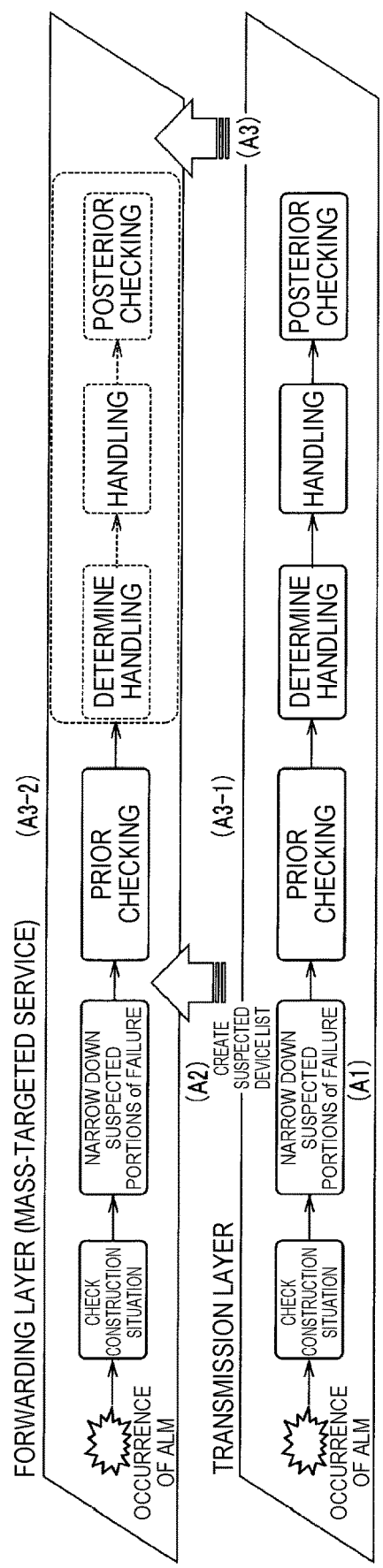
FIG. 10 shows discontinuation of a scenario owing to layer coordination (case 1).

FIG. 10 shows discontinuation of a scenario owing to layer coordination (case 1). As shown in FIG. 10, it is estimated on the transmission layer side that "there is a repercussion on the forwarding layer" (A1), and a notification to that effect is made from the transmission layer to the forwarding layer (mass-targeted service) (A2). In such a case, handling is continued at the transmission layer (A3-1). On the other hand, at the forwarding layer, processing is continued until "prior checking" and discontinued thereafter (A3-2). The processing discontinued at the forwarding layer is returned, depending on results of posterior checking on the transmission layer side (A3).

Figure 11:
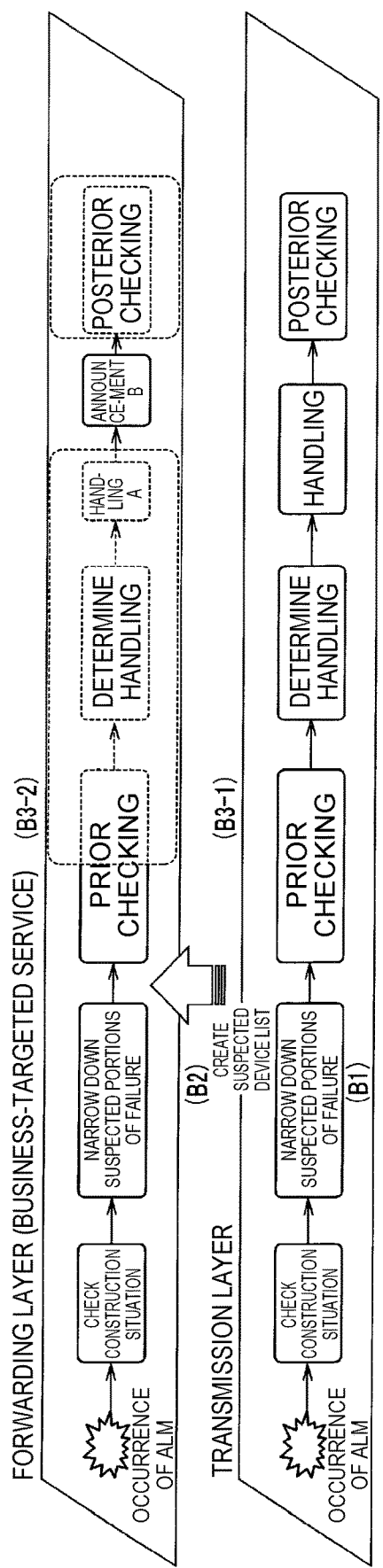
FIG. 11 shows change of a scenario owing to layer coordination (case 2).

FIG. 11 shows change of a scenario owing to layer coordination (case 2). As shown in FIG. 11, it is estimated on the transmission layer side that "there is a repercussion on the forwarding layer" (B1), and a notification to that effect is made from the transmission layer to the forwarding layer (business-targeted service) (B2). In such a case, handling is continued at the transmission layer (B3-1). On the other hand, at the forwarding layer, part of handling is skipped in midstream, and only an "announcement B" is made (B3-2). In the case 2, during a process step of "narrowing down suspected portions of a failure" in a scenario on the transmission layer side, an external device estimates that "there is a repercussion on the forwarding layer". The scenario management and execution unit 32 that has received the result of estimation makes a notification to the scenario coordination management unit 30B, whereby a scenario change can be made on the forwarding layer side.

(Operation Examples)

Figure 12:
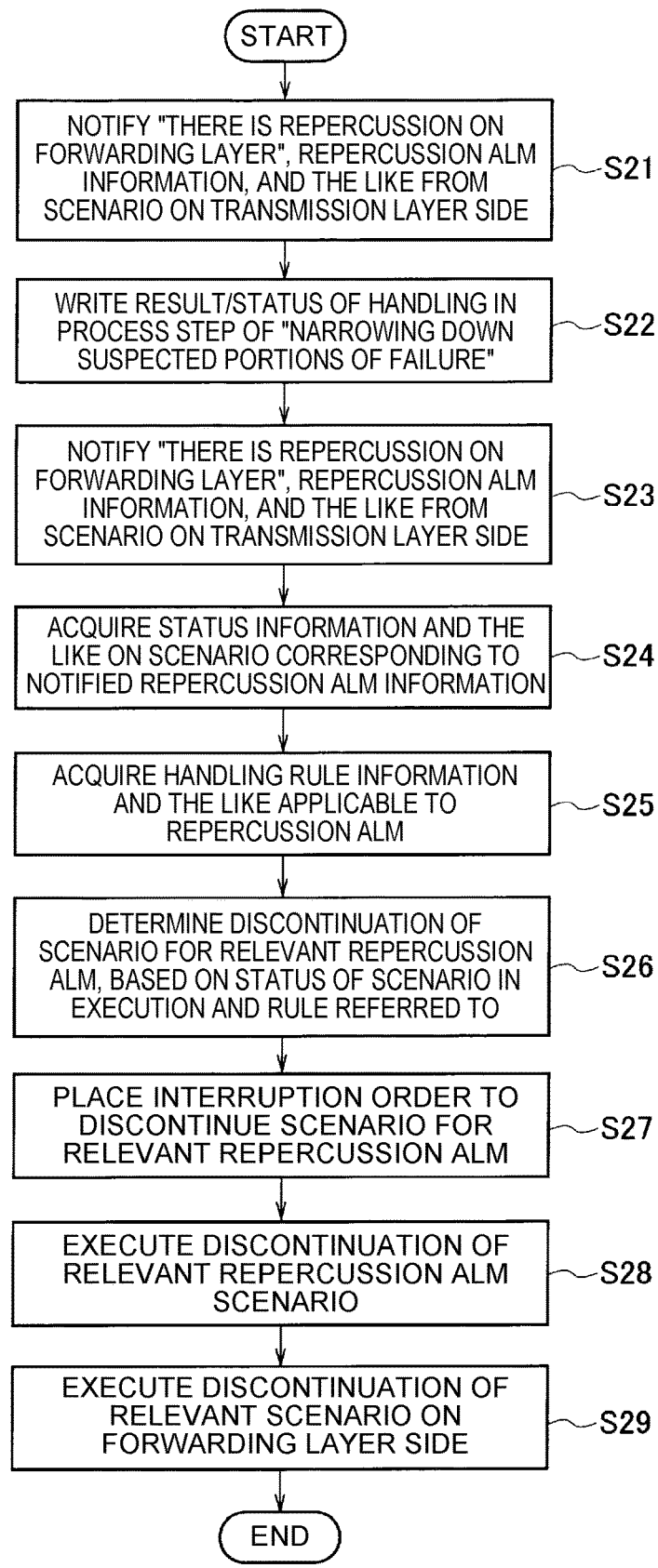
FIG. 12 is a flowchart showing an example of operation of the automatic coordination apparatus.

FIG. 12 is a flowchart showing an example of operation of the automatic coordination apparatus 30. Hereinafter, the example of operation of the automatic coordination apparatus 30 in the case 1 will be described with reference to FIGS. 10 and 12.

First, the adapter unit 34 receives, from an external suspected portion estimation system, information indicating that "there is a repercussion on the forwarding layer" that is a result of estimation, and makes a notification to the scenario execution and management unit 32 (step S21). Next, the scenario management and execution unit 32 writes a result and a status of handling in the process step of "narrowing down suspected portions of a failure" into the status management DB 30A (step S22), and notifies information indicating "there is a repercussion on the forwarding layer", repercussion ALM information, and the like to the scenario coordination management unit 30B (step S23). Next, the scenario coordination management unit 30B acquires, from the status management DB 30A, status information and the like on a scenario corresponding to the notified repercussion ALM information (step S24). Next, the scenario coordination management unit 30B acquires, from the scenario selection rule DB 30G, handling rule information applicable to a repercussion ALM (step S25). Next, the scenario coordination management unit 30B determines discontinuation of the scenario for the relevant repercussion ALM, based on the status of the scenario in execution and a rule referred to, and makes a notification to the scenario coordination control unit 30C (step S26). Next, the scenario coordination control unit 30C places an interruption order to discontinue the scenario for the relevant repercussion ALM (step S27). Next, the scenario management and execution unit 32 executes discontinuation of the relevant repercussion ALM scenario (step S28). Lastly, the adapter unit 34 executes discontinuation of a relevant scenario on the forwarding layer side (step S29).

Note that "check failure history at lower layer: yes" in FIG. 6 applies to step S25. Here, the condition of an item number 60 in FIG. 6 is "whether failure occurs at lower layer". A primary determination condition 20 in FIG. 8 applies to the case where an output for the condition is "yes". Moreover, as shown in FIG. 9, with respect to a primary determination condition ID of 20, the primary determination result is "handling is not needed", and the secondary determination result is "terminate". Accordingly, the scenario for the repercussion ALM is changed as "in execution"→"terminated (discontinued)".

As described above, when "there is a repercussion", repercussion ALM information (including an ALM ID), and the like are notified from a scenario on the transmission layer side, handling rule information applicable to a repercussion ALM is acquired. Thus, discontinuation of a scenario for the relevant repercussion ALM can be determined based on the handling rule information (primary determination condition ID: 20 in FIG. 9).

Figure 13:
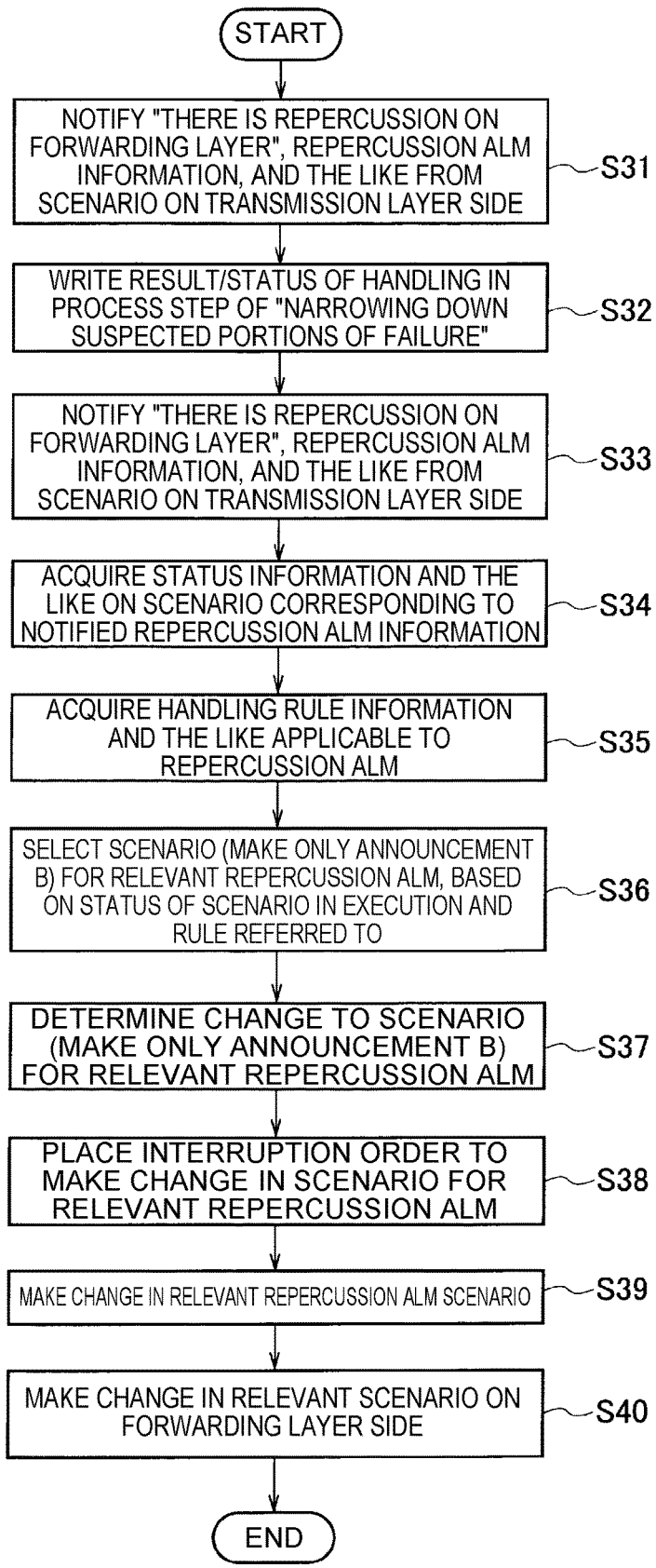
FIG. 13 is a flowchart showing an example of operation of the automatic coordination apparatus.

FIG. 13 is a flowchart showing an example of operation of the automatic coordination apparatus 30. Hereinafter, the example of operation of the automatic coordination apparatus 30 in the case 2 will be described with reference to FIGS. 11 and 13.

First, steps S31 to S35 in FIG. 13 are similar to steps S21 to S25 in FIG. 12. Here, when the scenario coordination management unit 30B instructs the scenario selection/change unit 30F to select/change a scenario, the scenario selection/change unit 30F selects a scenario (make only the announcement B) for a relevant repercussion ALM, based on a status of a scenario in execution and a rule referred to (step S36). Next, the scenario coordination management unit 30B determines a change to the scenario (make only the announcement B) for the relevant repercussion ALM, and makes a notification to the scenario coordination control unit 30C (step S37). Next, the scenario coordination control unit 30C places an interruption order to make a change in the scenario for the relevant repercussion ALM (step S38). Next, the scenario management and execution unit 32 makes a change in the relevant repercussion ALM scenario (step S39). Lastly, the adapter unit 34 makes a change in a relevant scenario on the forwarding layer side (step S40).

Note that "check failure history at lower layer: yes" in FIG. 6 applies to step S36. Here, the condition of the item number 60 in FIG. 6 is "whether failure occurs at lower layer". A primary determination condition 90 in FIG. 8 applies to the case where an output for the condition is "yes". Further, as shown in FIG. 9, with respect to a primary determination condition ID of 90, the primary determination result is "immediate handling is needed", and the content of handling is "announcement B". Accordingly, a change to the scenario (make only the announcement B) for the repercussion ALM is made.

As described above, when "there is a repercussion", repercussion ALM information (including an ALM ID), and the like are notified from a scenario on the transmission layer side, handling rule information applicable to a repercussion ALM is acquired. Thus, a change in the scenario for the relevant repercussion ALM can be determined based on the handling rule information (primary determination condition ID: 90 in FIG. 9).

(Example of Hardware Configuration of Automatic Coordination Apparatus)

Figure 14:
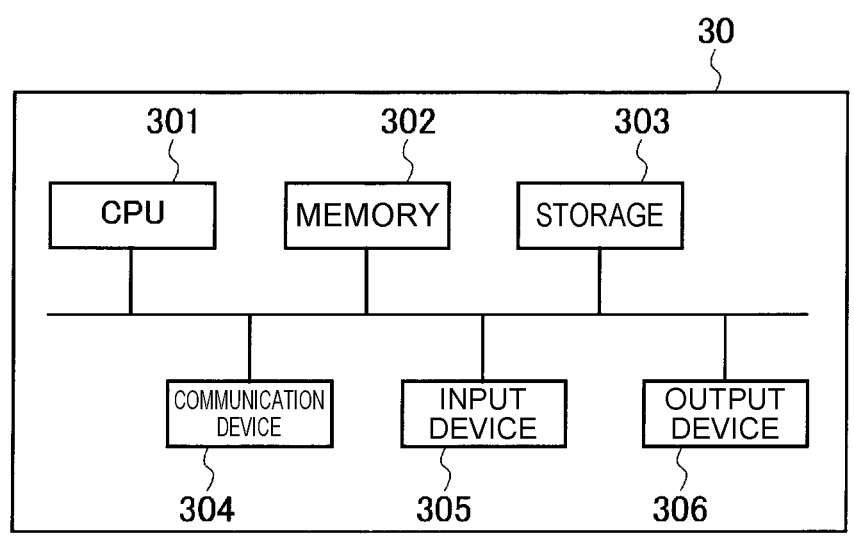
FIG. 14 is a hardware configuration diagram of the automatic coordination apparatus.

FIG. 14 is a hardware configuration diagram of the automatic coordination apparatus 30. For the automatic coordination apparatus 30, for example, a general-purpose computer system can be used that includes a CPU (Central Processing Unit, processor) 301, a memory 302, a storage 303 (HDD: Hard Disk Drive, SSD: Solid State Drive), a communication device 304, an input device 305, and an output device 306. The memory 302 and the storage 303 are storage devices. In the computer system, the CPU 301 executes a predetermined program loaded on the memory 302, whereby each function of the automatic coordination apparatus 30 is implemented.

The automatic coordination apparatus 30 may be implemented by using a single computer, or may be implemented by using a plurality of computers. The automatic coordination apparatus 30 may be a virtual machine implemented on a computer.

A program for automatic coordination can be stored in a computer-readable recording medium, such as an HDD, an SSD, a USB (Universal Serial Bus) memory, a CD (Compact Disc), or a DVD (Digital Versatile Disc), or can be distributed via a network.

(Characteristic Configuration of Automatic Coordination Apparatus and Effects Thereof)

The automatic coordination apparatus 30 according to the embodiment of the present invention includes: the scenario creation unit 100 that creates a scenario; the scenario coordination unit 200 that coordinates a plurality of the scenarios; and the scenario management and execution unit 32 that manages and executes the scenario, wherein a failure handling business operation is broken down into common and individual tasks, a parent scenario or a child scenario is defined for each of the separated tasks or each task group made by combining a plurality of tasks, the scenario is divided, management across a plurality of the scenarios is performed based on a relationship between each scenario (parent scenario) and a status of execution of each scenario, and the scenario is discontinued or changed depending on a process and a content of failure handling. Thus, the automatic coordination apparatus 30 that is applicable to the failure handling business operation can be provided.

Specifically, in the automatic coordination apparatus 30 according to the embodiment of the present invention, a subsequent scenario is dynamically selected depending on a result of each process step of failure handling, and the scenario is discontinued or changed when it is estimated that the scenario is for a repercussion from a main factor of a failure. In this way, the automatic coordination apparatus 30 according to the embodiment of the present invention can eliminate unnecessary processing and achieve efficient processing.

An automatic coordination method according to the embodiment of the present invention includes: by the automatic coordination apparatus 30, a scenario creation step of creating a scenario; a scenario coordination step of coordinating a plurality of the scenarios; and a scenario management and execution step of managing and executing the scenario, wherein a failure handling business operation is broken down into common and individual tasks, a parent scenario or a child scenario is defined for each of the separated tasks or each task group made by combining a plurality of tasks, the scenario is divided, management across a plurality of the scenarios is performed based on a relationship between each scenario (parent scenario) and a status of execution of each scenario, and the scenario is discontinued or changed depending on a process and a content of failure handling. Thus, the automatic coordination method that is applicable to the failure handling business operation can be provided.

An automatic coordination program according to the embodiment of the present invention is an automatic coordination program causing a computer to function as the automatic coordination apparatus 30. Thus, the automatic coordination program that is applicable to the failure handling business operation can be provided.

As described hereinabove, the embodiment of the present invention implements automation of the failure handling business operation by automatically coordinating a group of operation systems for a maintenance system by using an orchestrator. The embodiment of the present invention makes it possible to divide a coordination rule requiring an enormous number of conditional branches, to dynamically combine a plurality of child scenarios associated with divided coordination rules, and further to perform management and control that extend across a plurality of scenarios, taking into consideration a dependency relationship between the scenarios. As a result, not only the failure handling business operation is automated, but also enhanced performance of the orchestrator is achieved.

Specifically, according to the embodiment of the present invention, the inter-scenario coordination method is implemented in which between scenarios having a dependency relationship, control from one scenario over the other scenario (discontinuation of processing/return from discontinuation) is performed, or a scenario change is made in midstream. According to the embodiment of the present invention, the automatic parent scenario creation method is implemented in which a coordination rule is divided, a child scenario is created for each of divided coordination rules, a plurality of child scenarios are dynamically selected and combined, and a parent scenario that automates the failure handling business operation is created. Moreover, according to the embodiment of the present invention, the child scenario classification method is implemented in which in the parent scenario that automates the failure handling business operation, prior checking and posterior checking scenarios are classified as common child scenarios, and suspected failure portion narrowing-down and handling scenarios are classified as individual child scenarios. Further, according to the embodiment of the present invention, the handling scenario execution necessity/unnecessity and content determination method is implemented in which it is determined whether or not execution of a handling scenario is needed, and a handling scenario is selected, based on results of processing of the prior checking scenario (primary determination) and the ALM occurrence history (secondary determination) in combination.

REFERENCE SIGNS LIST 30 automatic coordination apparatus
30A Status management DB
30B Scenario coordination management unit
30C Scenario coordination control unit
30D Parent scenario generation unit
30E ALM occurrence history DB
30F Scenario selection/change unit
30G Scenario selection rule DB
31 Business operation API unit
32 Scenario management and execution unit
33 Business operation resource management unit
34 Adapter unit
100 Scenario creation unit
200 Scenario coordination unit

The invention claimed is:

1. An automatic coordination apparatus comprising:
a scenario creation unit that is implemented using one or more computing devices and that is configured to create a scenario;
a scenario coordination unit that is implemented using one or more computing devices and that is configured to coordinate a plurality of scenarios; and
a scenario management and execution unit that is implemented using one or more computing devices and that is configured to manage and execute the scenario,
wherein the scenario management and execution unit is configured to:
break a failure handling business operation into common and individual tasks,
define a parent scenario or a child scenario for each of the common and individual tasks or each task group made by combining a plurality of tasks,
divide the scenario,
perform management across a plurality of the scenarios based on a relationship between each scenario and a status of execution of each scenario,
select a subsequent scenario depending on a result of each process step of failure handling, and
discontinue or change the scenario based on (i) a process and a content of failure handling and (ii) estimation that the scenario is for a repercussion from a main factor of a failure.

2. The automatic coordination apparatus according to claim 1,
wherein the scenario coordination unit is configured to:
acquire, from the scenario creation unit, handling rule information applicable to the repercussion,
determine discontinuation of the scenario based on the status of execution of the scenario and the handling rule information, and
generate an interruption order to discontinue the scenario based on a determination to discontinue to the scenario, and
wherein scenario management and execution unit is configured to discontinue the scenario based on the generated interruption order.

3. The automatic coordination apparatus according to claim 1,
wherein the scenario coordination unit is configured to:
acquire, from the scenario creation unit, handling rule information applicable to the repercussion,
select the subsequent scenario based on the status of execution of the scenario and the handling rule information,
generate an interruption order to change the scenario, and
wherein scenario management and execution unit is configured to change the scenario to the subsequent scenario based on the generated interruption order.

4. An automatic coordination method performed by an automatic coordination apparatus comprising:
creating a scenario;
coordinating a plurality of scenarios; and
managing and executing the scenario,
wherein managing and executing the scenario includes:
breaking a failure handling business operation into common and individual tasks,
defining a parent scenario or a child scenario for each of the common and individual tasks or each task group made by combining a plurality of tasks,
dividing the scenario,
performing management across a plurality of the scenarios based on a relationship between each scenario and a status of execution of each scenario,
selecting a subsequent scenario depending on a result of each process step of failure handling, and
discontinuing or changing the scenario based on (i) a process and a content of failure handling and (ii)

estimation that the scenario is for a repercussion from a main factor of a failure.

5. The automatic coordination method according to claim 4,
wherein managing and executing the scenario includes:
acquiring handling rule information applicable to the repercussion,
determining discontinuation of the scenario based on the status of execution of the scenario and the handling rule information,
generating an interruption order to discontinue the scenario based on a determination to discontinue to the scenario, and
discontinuing the scenario based on the generated interruption order.

6. The automatic coordination method according to claim 4,
wherein managing and executing the scenario includes:
acquiring handling rule information applicable to the repercussion,
selecting the subsequent scenario based on the status of execution of the scenario and the handling rule information,
generating an interruption order to change the scenario, and
changing the scenario to the subsequent scenario based on the generated interruption order.

7. A non-transitory recording medium storing an automatic coordination program, wherein execution of the program causes one or more computers to perform operations comprising:
creating a scenario;
coordinating a plurality of scenarios; and
managing and executing the scenario,
wherein managing and executing the scenario includes:
breaking a failure handling business operation into common and individual tasks,
defining a parent scenario or a child scenario for each of the common and individual tasks or each task group made by combining a plurality of tasks,
dividing the scenario,
performing management across a plurality of the scenarios based on a relationship between each scenario and a status of execution of each scenario,
selecting a subsequent scenario based on a result of each process step of failure handling, and
discontinuing or changing the scenario based on (i) a process and a content of failure handling and (ii) estimation that the scenario is for a repercussion from a main factor of a failure.

8. The non-transitory recording medium according to claim 7,
wherein managing and executing the scenario includes:
acquiring handling rule information applicable to the repercussion,
determining discontinuation of the scenario based on the status of execution of the scenario and the handling rule information,
generating an interruption order to discontinue the scenario based on a determination to discontinue to the scenario, and
discontinuing the scenario based on the generated interruption order.

9. The non-transitory recording medium according to claim 7,
wherein managing and executing the scenario includes:
acquiring handling rule information applicable to the repercussion,
selecting the subsequent scenario based on the status of execution of the scenario and the handling rule information,
generating an interruption order to change the scenario, and
changing the scenario to the subsequent scenario based on the generated interruption order.

* * * * *